US008745575B2

(12) United States Patent
Britton et al.

(10) Patent No.: US 8,745,575 B2
(45) Date of Patent: Jun. 3, 2014

(54) PATTERN BASED ADMINSTRATION OF AN OPERATION IN A COMPONENT BASED COMPUTING SOLUTION

(75) Inventors: Kathryn H. Britton, Chapel Hill, NC (US); John G. Dudley, Raleigh, NC (US); Yongcheng Li, Cary, NC (US); Yih-Shin Tan, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 2588 days.

(21) Appl. No.: 11/393,410

(22) Filed: Mar. 30, 2006

(65) Prior Publication Data

US 2007/0240111 A1    Oct. 11, 2007

(51) Int. Cl.
*G06F 9/44* (2006.01)

(52) U.S. Cl.
CPC ........................................ *G06F 8/35* (2013.01)
USPC ........................................................ 717/104

(58) Field of Classification Search
CPC .......................................................... G06F 8/35
USPC .................................................. 717/107, 104
See application file for complete search history.

(56) References Cited

U.S. PATENT DOCUMENTS

| | | | |
|---|---|---|---|
| 5,838,918 A | 11/1998 | Prager et al. | |
| 6,065,105 A * | 5/2000 | Zaidi et al. | 712/23 |
| 6,557,095 B1 * | 4/2003 | Henstrom | 712/216 |
| 6,613,098 B1 * | 9/2003 | Sorge et al. | 715/234 |
| 6,810,401 B1 | 10/2004 | Thompson et al. | |
| 7,174,540 B2 * | 2/2007 | Ondrusek et al. | 717/120 |
| 2001/0034771 A1 * | 10/2001 | Hutsch et al. | 709/217 |
| 2003/0066050 A1 * | 4/2003 | Wang et al. | 717/105 |
| 2004/0068485 A1 | 4/2004 | Thompson et al. | |
| 2005/0097517 A1 | 5/2005 | Goin et al. | |

OTHER PUBLICATIONS

Louis J.M. Taborda, "The Release Matrix for Component-Based Software", May 2004, 7th International Symposium, CBSE 2004, pp. 100-113.*
Bixin Li, "Managing Dependencies in Component-Based Systems Based on Matrix Model", 2003, Proc. of Net.Object.Days 2003, pp. 22-25.*

* cited by examiner

*Primary Examiner* — Wei Zhen
*Assistant Examiner* — Lanny Ung
(74) *Attorney, Agent, or Firm* — Steven M. Greenberg, Esq.; CRGO Law

(57) ABSTRACT

Embodiments of the present invention address deficiencies of the art in respect to administering and automating operations in a component based application and provide a method, system and computer program product for the pattern based administration of operations in a component based computing solution. In one embodiment of the invention, a composite application data processing system enabled for pattern based administration of an operation can include a dependency matrix model, a set of artifacts, each artifact associated with a particular action for a particular computing platform, and a pattern generated operation task control enabled to process an instance of the dependency matrix model through an invocation of selected ones of the artifacts.

17 Claims, 4 Drawing Sheets

PATTERN BASED ADMINSTRATION OF AN OPERATION IN A COMPONENT BASED COMPUTING SOLUTION

BACKGROUND OF THE INVENTION

1. Field of the Invention

The present invention relates to the field of enterprise computing environment administration and more particularly to the automated and assisted configuration of operations in an enterprise computing system.

2. Description of the Related Art

Component based user applications address the rigid nature of unitary, consolidated applications which are programmed to support a particular application need without providing substantial flexibility. In the unitary, consolidated application, little can be done if the particular application needs change. By comparison, in component based computing, different components provide atomic elements of application functionality. Individual components can be combined with other components to dynamically assemble an application which provides a specific type of functionality to flexibly support a particular application need, even as the application needs change. Examples of component based computing implementations include collaborative computing applications and portal computing environments.

Portal frameworks support a component based model for building user facing applications. Portal applications represent assemblies of user-facing components which can be combined in different ways to produce different applications. Portlets are the visibly active, user-facing components included as part of portal pages. Similar to the graphical windows paradigm of windowing operating systems, each portlet in a portal application occupies a portion of the portal page through which the portlet can display associated content from a portlet channel. The prototypical portlet can be implemented as a server-side script executed through a portal server.

The component based model supports the deployment of customer solutions from multiple different computing components, including different Web servers, application servers and the like. Yet deploying different computing components in coordination to enable the aggregate solution can require a great deal of coordination—particularly during installation and update operations that traverse the different components. In fact, to administer operations that traverse the different computing components, a level of expertise and familiarity can be required of the administrator.

Specifically, an enhanced level of expertise and familiarity with the administration of operations that traverse different components in an aggregated customer solution can be required because no single set of documentation generally exists for the combination of components forming the customer solution. Rather, documentation exists only for the individual components of the customer solution. Moreover, automating the operation can require a similar level of expertise and familiarity. Thus, for the typical customer, the process of administering and automating an operation across the different components of a component based customer solution has proven difficult.

BRIEF SUMMARY OF THE INVENTION

Embodiments of the present invention address deficiencies of the art in respect to administering and automating operations in a component based application and provide a novel and non-obvious method, system and computer program product for the pattern based administration of operations in a component based computing solution. In one embodiment of the invention, a composite application data processing system enabled for pattern based administration of an operation can include a dependency matrix model, a set of artifacts, each artifact associated with a particular action for a particular computing platform, and a pattern generated operation task control enabled to process an instance of the dependency matrix model through an invocation of selected ones of the artifacts.

The dependency matrix model can include a set of dependencies. As used herein, a dependency can define a set of dependent components and the actions to be performed on those components in order to complete the execution of a subtask of an operation. Each dependency can include an association with at least one component, a cross dependency manager referencing the dependencies, and a stage manager referenced by at least one of the dependencies. In this regard, the stage manager can include a state machine for triggering actions in one or more different ones of the dependencies based upon completion of other actions on other ones of the dependencies. In one aspect of the embodiment, the pattern generated operation task control is a cross dependency portlet referencing the cross dependency manager. In another aspect of the embodiment, the cross dependency manager can utilize component service interfaces exposed by component portlets to execute component actions.

Another embodiment of the invention can include a method for pattern based administration of an operation. The method of the embodiment can include creating an instance of a dependency matrix model; associating the instance with a pattern; matching a requested operation to the pattern; and, processing the instance responsive to matching the requested operation to the pattern. Creating an instance of a dependency matrix model can include creating an instance of a cross dependency manager; adding a plurality of components and dependencies to the cross dependency manager; and, referencing a stage manager from at least one of the dependencies.

Likewise, processing the instance responsive to matching the requested operation to the pattern can include retrieving the instance of the cross dependency manager, selecting at least one component associated with a dependency referenced by the cross dependency manager; and executing an action encapsulated within the selected component so that the encapsulating component can be specified as the target subject of the action. Subsequently, additional dependencies can be identified in the stage manager based upon completion of the executed action; and the process of selection, execution and identification can be repeated for the additional dependency.

In yet another embodiment of the invention, a method for pattern based administration of an operation can include defining a selection of tasks for a pattern for a specific system configuration; adding to the pattern a set of components for completing the selection of tasks; and further adding to the pattern a plurality of corresponding dependencies for the components. For instance, defining a selection of tasks for a pattern for a specific system configuration can include defining a selection of tasks for one of a system tuning operation, password change operation, and a component name change operation. Each of the components and the dependencies can be added to an instance of a cross dependency matrix model. Thereafter, actions in each of the components can be sequenced for each of the tasks in the cross dependency matrix model. Finally, the instance of the cross dependency matrix can be persisted in a set of markup formatted descriptors.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for the pattern based administration of an operation in a component based system. In accordance with an embodiment of the present invention, a living operations journal can be constructed for an operation in a component based system. The living operations journal can be an instance of a defined pattern of tasks for the operation. The operation can include any of a tuning operation, password change operation, and a component name change operation, to name only a few. In each instance, the performance of the operation can require the execution of multiple actions across different dependent components in order to effectuate the operation.

The pattern can be embodied within a dependency matrix instance specifying the different dependent components for the operation and the corresponding actions to be performed in each component. The dependency matrix instance further can provide a sequence of performing the actions in order to effectuate the operation across all dependent components. Notably, the dependency matrix instance can be refined for each performance of the operation such that the living operations journal transforms from a record of the tasks of the operation to an operations guide for the operation. As such, documentation for a cross-component dependent operation can evolve so as to replace the isolated documentation for each component of the dependent operation.

Figure 1:
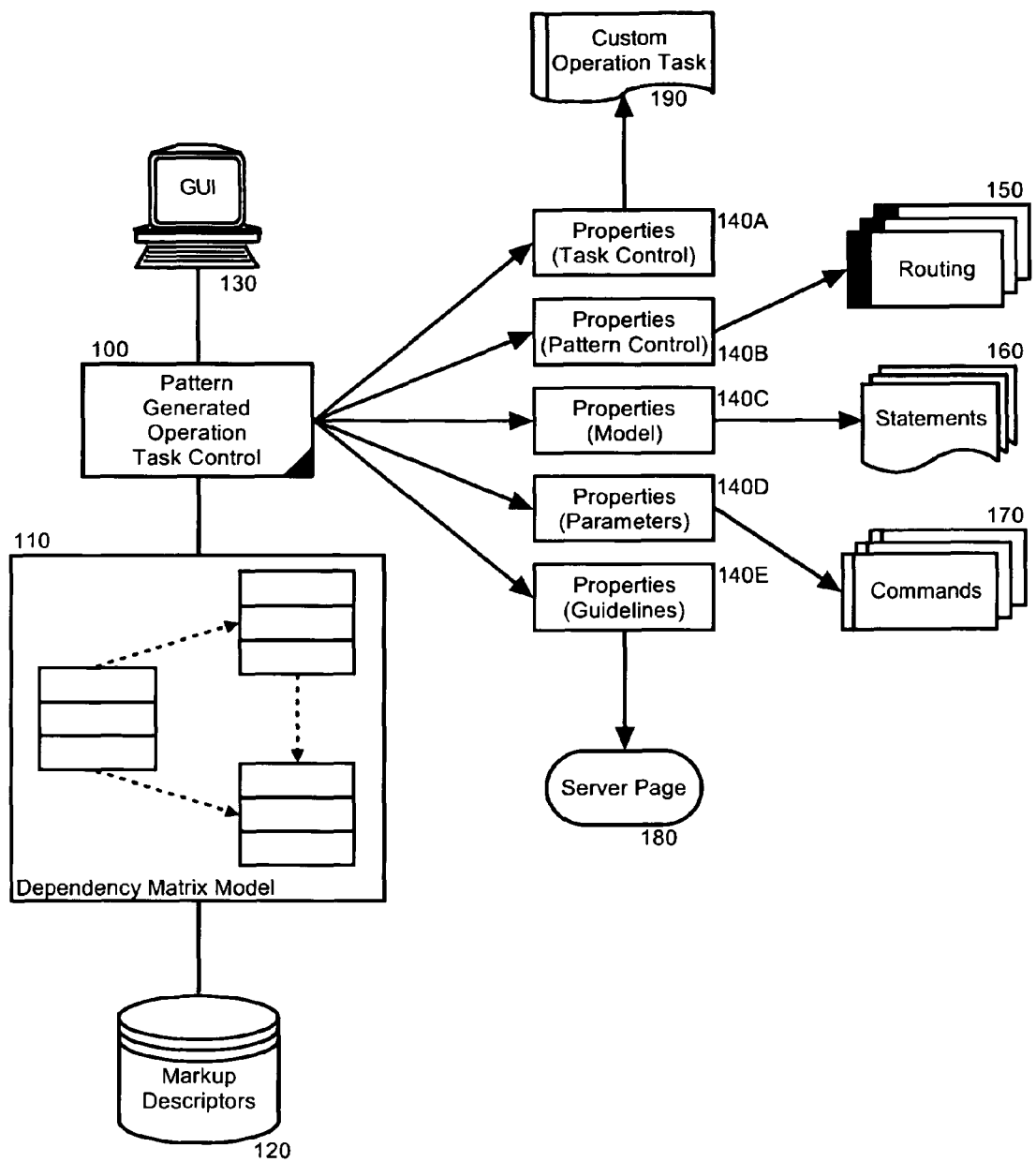
FIG. 1 is a schematic illustration of a composite application data processing system enabled for pattern based administration of an operation.

In illustration, FIG. 1 is a schematic illustration of a composite application data processing system enabled for pattern based administration of an operation. The data processing system can include a graphical user interface 130 exposing the functionality of pattern generated operation task control 100. The pattern generated operation task control 100 can be coupled to an instance of a dependency matrix model 110 that can be persisted in one or more markup language formatted descriptors 120. The pattern generated operation task control 100 can manage the administration of the operation across different dependent components in a composite application.

A set of artifacts 150, 160, 170 can be utilized by the pattern generated operation task control 100 in administering an operation through the administration interface of each respective external component. The artifacts 150, 160, 170 can include routing type artifacts 150, command statements 160 and command scripts 170, each used to execute tasks in a corresponding environment such as an operating system, application server, or database engine. The routing type artifacts 150 can include command routing, action routing and sequential execution tables. The command statements 160, by comparison, can include text file message strings, Ant scripting statements, application server administration scripting statements, and command line statements such as those found in batch files, to name only a few examples. Finally, the commands 170 can include database engine commands.

Properties files 140A, 140B, 140C, 140D, 140E can link the artifacts 190, 150, 160, 170, 180 to the logic of the pattern generated operation task control 100. In this regard, the task control properties file 140A identifies custom extension operation classes 190, the pattern control properties file 140B identifies the repository and convention for action routing and sequence tables 150, and the model and parameters properties files 140C, 140D identify the repository, convention, and parameters for the artifacts 160, 170. Finally, the guidelines properties file 140E identifies the repository and convention for operations instruction viewing files 180. Utilizing the artifacts 190, 150, 160, 170, 180 through the properties files 140A, 140B, 140C, 140D, 140E the pattern generated operation task control 100 can invoke the logic of the artifacts 190, 150, 160, 170, 180 as described by these properties files in order to complete tasks in different dependent heterogeneous components for a cross-dependency operation.

Each instance of the dependency matrix model 110 can describe a cross-dependency operation in varying levels of detail depending upon the level of detailed information provided to the dependency matrix model 110. In its least complete form, an instance of the dependency matrix model 110 can provide a mere guide to completing a cross-dependency operation. For instance, a task might initially be recorded as a simple instruction such as "Change parameter X in component Y from value A to value B." When an end user performs the recorded task, however, expertise is gained and the user is able to augment the simple instruction to "Open the administrative console for component Y, navigate to page Z where parameter X is shown, provide the value A into the corresponding field, select 'Save', and close the console."

Thus, as additional detail is added during the performance of the operation, the instance of the dependency matrix model 110 becomes a living operations journal of the performance of the operation. Finally, in its most complete form, when a maximal amount of data has been provided to the instance of the dependency matrix model 110, the instance of the dependency matrix model 110 becomes an automated form of the operation requiring little if any human intervention.

Figure 2:
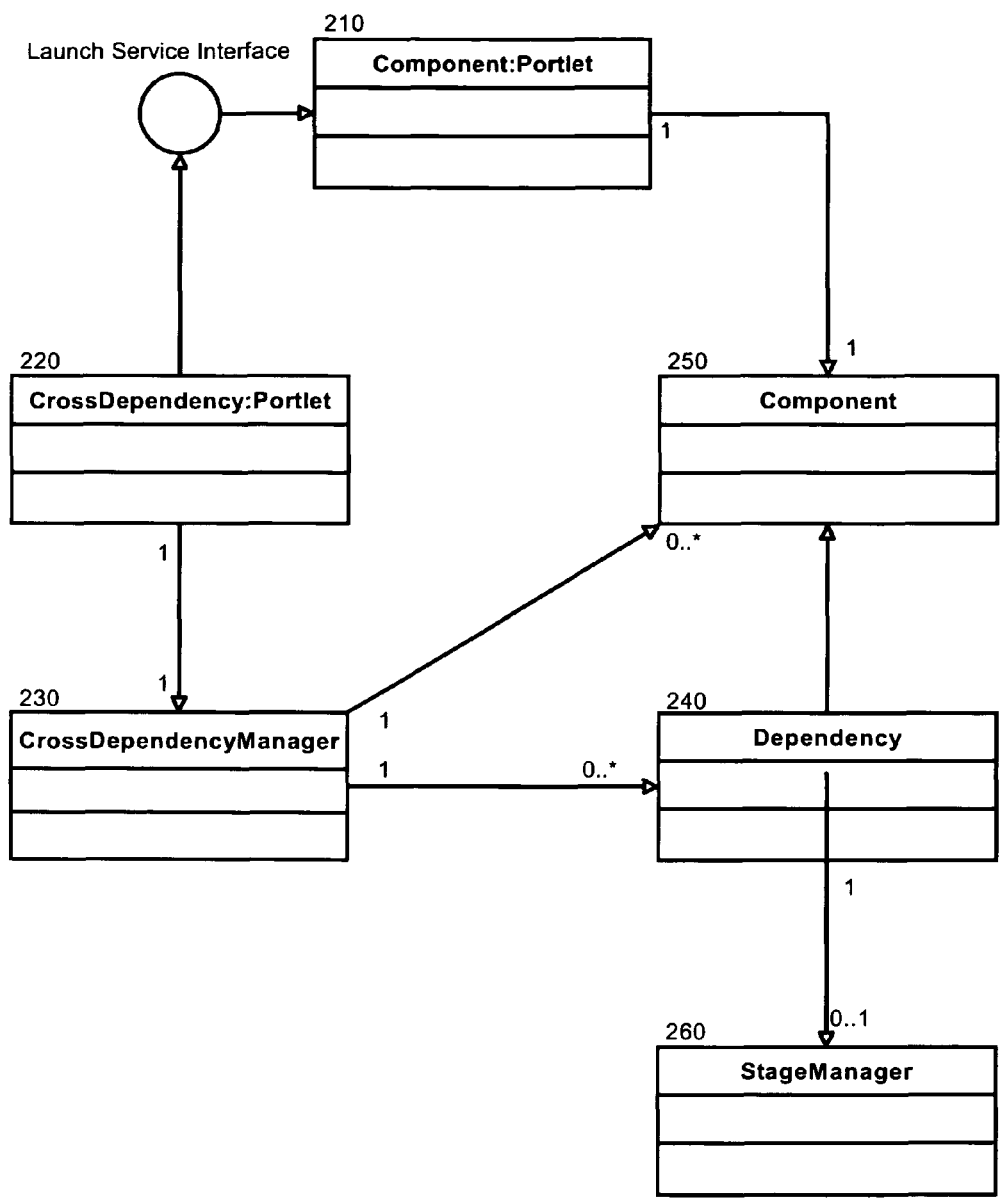
FIG. 2 is a class diagram of a dependency matrix model for use in the pattern based administration of an operation.

In more particular illustration, FIG. 2 is a class diagram of a dependency matrix model for use in the pattern based administration of an operation. The dependency matrix model can include a cross dependency manager 230 associated with one or more dependencies 240 each referencing one or more corresponding components 250. One or more stage managers 260 further can be associated with each of the dependencies 260. In this regard, each stage manager can encapsulate a state machine indicating tasks to perform in one or more of the dependencies 240 upon the completion of a task in an associated one of the dependencies 240. Notably, the dependency matrix model can be initiated by a cross dependency portlet 220 such as the pattern generated operation task control of FIG. 1. As such, the cross dependency portlet 220 can access components 250 through a service interface exposed by the component portlets 210.

The cross dependency manager 230 can expose getter and setter methods for dependency properties such as the name of the cross dependency manager 230 and a list of names for dependencies 240. Administrative tasks also can be exposed, as can guidelines for custom operations and a list of custom guideline topics--essentially portions of an operations guide for an operation. The cross dependency manager 230 further can expose a method for creating or modifying an existing one of the components 250, and a method for listing component names accessible by the cross dependency manager 230. Finally, the cross dependency manager 230 can include methods for checking for the existence of and removing components 250 and dependencies 240.

Each of the dependencies 240, in turn, can provide a place for the cross dependency manager 230 to hold specific dependency information. The specific dependency information can include the dependency name, a description of the dependency, a status for the dependency, a name for an update action for the dependency and a class identifier for the update action. The specific dependency information further can include a name of a change action enabled to trigger the update action, a date of the last time the change trigger action occurred and a policy statement governing the change policy. The specific dependency information yet further can include a reference to one or more components 250 in the dependency and a list of component names in the dependency. Finally, a stage manager 260 can be referenced within each of the dependencies along with administrative methods such as saving and loading the dependency, determining if a change is due according to the trigger policy, and determining if an update action has completed.

Each of the components 250 referenced in one of the dependencies 240 may hold specific information. In addition, a component may include platform specific logic enabled to undertake a specific action or task. Getter and setter methods can be provided by a component's service interface including getter and setter methods for identifying particular information about the component and platform, determining the state of the component such as whether the component has an action pending and so forth, and a name of an action to be invoked on the component.

The stage manager 260 can manage the state of completion of an operation associated with the stage manager 260. To that end, the stage manager 260 can manage the cross-dependency nature of the operation in that the stage manager 260 can track the processing stages of component actions for a dependency. The stage information 260 can be set, queried and manipulated through methods exposed by the stage manager. Examples include listing an order of invocation for dependency actions, and a status of dependency actions.

Figure 3:
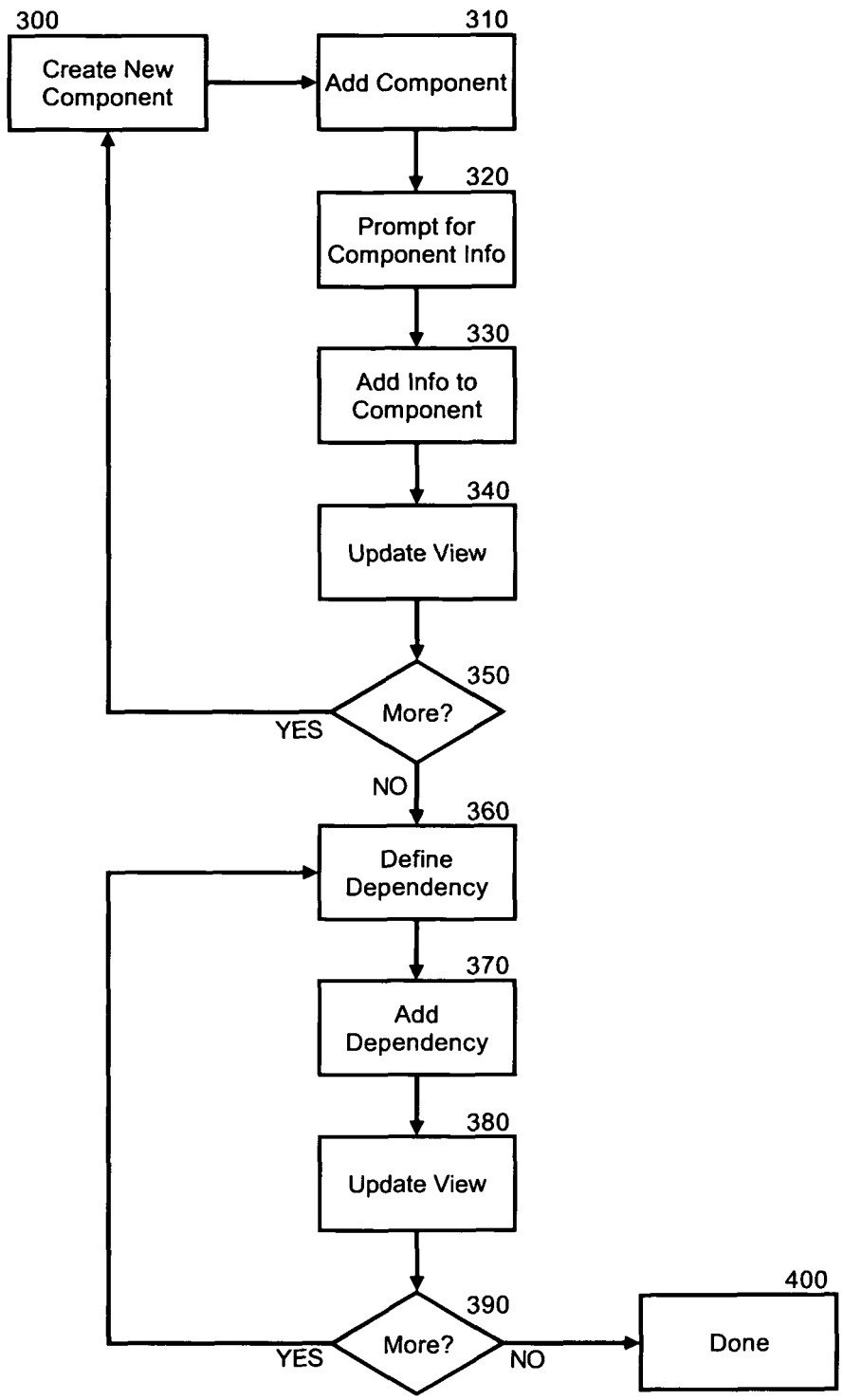
FIG. 3 is a flow chart illustrating a process for generating an instance of a dependency matrix model; and, FIG. 4 is a flow chart illustrating a process for the pattern based administration of an operation utilizing an instance of a dependency matrix model.

In operation, an instance of the cross dependency matrix can be created for an operation encompassing multiple components having multiple dependencies. An engine can process the cross dependency matrix to manage the performance of the operation and to provide a living operations journal for the operation to guide users in the administration of the operation. Specifically, FIG. 3 is a flow chart illustrating a process for generating an instance of a dependency matrix model. In block 300, a new component can be created and added to the matrix instance in block 310. In block 320, a prompt can be generated to collect information relating to the component and in block 330, the information can be added to the component in the matrix instance. Thereafter, the view of the matrix instance can be updated to reflect the addition of the component.

In decision block 350, if additional components are to be added to the matrix instance, the process can repeat through block 300. When no further components are to be added to the matrix instance, in block 360, a dependency can be defined for the matrix instance to include one or more referenced components. In block 370, the defined dependency can be added to the matrix instance and in block 380 the view of the matrix instance can be updated to reflect the newly added dependency. Thereafter, in decision block 390, if additional dependencies are to be added to the matrix instance, the process can repeat in block 360. When no further dependencies remain to be added to the matrix instance, the process can end in block 400.

Figure 4:
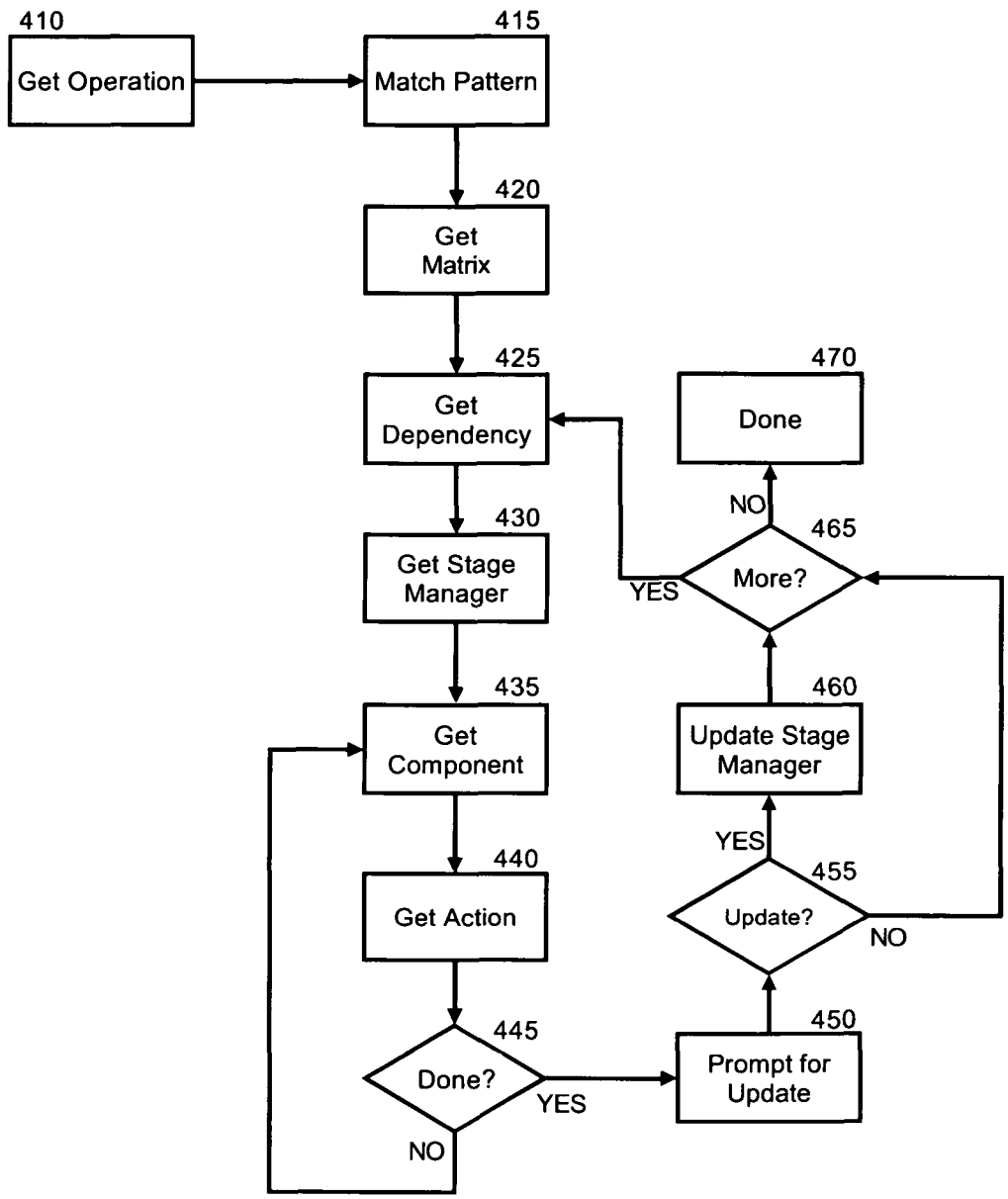

Once the matrix instance has been created for an operation, the matrix instance can be associated with a pattern for the operation and utilized to administer the operation. Specifically, in FIG. 4, a flow chart is shown which illustrates a process for the pattern based administration of an operation utilizing an instance of a dependency matrix model such as that created in FIG. 3. Beginning in block 410, an operation can be retrieved for processing and the operation can be matched to a pattern in block 415. In block 420, a matrix instance can be retrieved for the pattern and processed accordingly. Once a matrix instance has been retrieved, in block 425, a dependency for the matrix instance can be selected In block 430, a stage manager can be retrieved for the dependency and in block 435, one or more components can be selected for the dependency referenced by a stage manager. In block 440, the action encapsulated within each selected component can be executed. Thereafter, in decision block 445, if all of the actions have completed, in block 450 a prompt can be issued to update the stage manager with pertinent information and in decision block 455, if an update is chosen, in block 460 the stage manager can be updated. In this way, the living operations journal embodied by the matrix instance can be refined towards automation and comprehensive documentation for the administration of the operation. Subsequently, in decision block 465, if additional dependencies are referenced by the stage manager, the process can repeat through block 425. Otherwise, the process can end.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, or transport the program for use by or in connection with the instruction execution system, apparatus, or device. The medium can be an electronic, magnetic, optical, electromagnetic, semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A composite application data processing system enabled for pattern based administration of an operation, the system comprising:
   a dependency matrix model specifying different dependent components for an operation, corresponding actions to be performed in each of the components and a sequence of performing the actions in order to effectuate the operation across the dependent components;
   a plurality of artifacts, each artifact associated with a particular action for a particular computing platform; and,
   a pattern generated operation task control executing in memory by a processor of a computer and enabled to process an instance of the dependency matrix model through an invocation of selected ones of the artifacts.

2. The system of claim 1, wherein the dependency matrix model comprises:
   a plurality of dependencies, each having an association with at least one component;
   a cross dependency manager referencing the dependencies; and,
   a stage manager referenced by at least one of the dependencies.

3. The system of claim 2, wherein the stage manager comprises a state machine for triggering actions in different ones of the dependencies based upon completion of other actions on other ones of the dependencies.

4. The system of claim 2, wherein the pattern generated operation task control is a cross dependency portlet referencing the cross dependency manager.

5. The system of claim 4, wherein the cross dependency manager comprises a service interface for use by a component portlet.

6. A method for pattern based administration of an operation, the method comprising:
   creating an instance of a dependency matrix model in memory of a computer, the model specifying different dependent components for an operation, corresponding actions to be performed in each of the components and a sequence of performing the actions in order to effectuate the operation across the dependent components;
   associating the instance with a pattern;
   matching a requested operation to the pattern; and,
   processing the instance responsive to matching the requested operation to the pattern.

7. The method of claim 6, wherein creating an instance of a dependency matrix model comprises:
   creating an instance of a cross dependency manager;
   adding a plurality of components and dependencies to the cross dependency manager; and,
   referencing a stage manager from at least one of the dependencies.

8. The method of claim 7, wherein processing the instance responsive to matching the requested operation to the pattern comprises:
   retrieving the instance of the cross dependency manager,
   selecting at least one component associated with a dependency referenced by the cross dependency manager;
   executing an action encapsulated within the selected component;
   identifying an additional dependency in the stage manager based upon completion of the executed action; and,
   repeating the selection, execution and identification for the additional dependency.

9. A computer program product comprising a computer usable hardware device embodying computer usable program code for pattern based administration of an operation, the computer program product including:
   computer usable program code for creating an instance of a dependency matrix model specifying different dependent components for an operation, corresponding actions to be performed in each of the components and a sequence of performing the actions in order to effectuate the operation across the dependant components;
   computer usable program code for associating the instance with a pattern;
   computer usable program code for matching a requested operation to the pattern;
   and, computer usable program code for processing the instance responsive to matching the requested operation to the pattern.

10. The computer program product of claim 9, wherein the computer usable program code for creating an instance of a dependency matrix model comprises:
    computer usable program code for creating an instance of a cross dependency manager;
    computer usable program code for adding a plurality of components and dependencies to the cross dependency manager; and,
    computer usable program code for referencing a stage manager from at least one of the dependencies.

11. The computer program product of claim 10, wherein the computer usable program code for processing the instance responsive to matching the requested operation to the pattern comprises:
    computer usable program code for retrieving the instance of the cross dependency manager,
    computer usable program code for selecting at least one component associated with a dependency referenced by the cross dependency manager;
    computer usable program code for executing an action encapsulated within the selected component;
    computer usable program code for identifying an additional dependency in the stage manager based upon completion of the executed action; and,
    computer usable program code for repeating the selection, execution and identification for the additional dependency.

12. A method for pattern based administration of an operation, the method comprising:
    defining a selection of tasks for a pattern for a specific system configuration;
    adding to the pattern a plurality of components for completing the selection of tasks;

further adding to the pattern a plurality of corresponding dependencies for the components;

adding the components and the dependencies to an instance of a cross dependency matrix model in memory of a computer, the model specifying different dependent components for an operation, corresponding actions to be performed in each of the components and a sequence of performing the actions in order to effectuate the operation across the dependent components;

sequencing actions in each of the components for each of the tasks in the cross dependency matrix model; and, persisting the instance in a set of markup formatted descriptors.

13. The method of claim 12, further comprising:

retrieving the instance of the cross dependency matrix model; and, administering the operation in performing the tasks for the specific system configuration through processing the instance of the cross dependency matrix model.

14. The method of claim 12, wherein defining a selection of tasks for a pattern for a specific system configuration comprises defining a selection of tasks for one of a system tuning operation, password change operation, and a component name change operation.

15. A computer program product comprising a computer usable hardware device embodying computer usable program code for pattern based administration of an operation, the computer program product including:

computer usable program code for defining a selection of tasks for a pattern for a specific system configuration;

computer usable program code for adding to the pattern a plurality of components for completing the selection of tasks;

computer usable program code for further adding to the pattern a plurality of corresponding dependencies for the components;

computer usable program code for adding the components and the dependencies to an instance of a cross dependency matrix model specifying different dependent components for an operation, corresponding actions to be performed in each of the components and a sequence of performing the actions in order to effectuate the operation across the dependent components; computer usable program code for sequencing actions in each of the components for each of the tasks in the cross dependency matrix model;

and computer usable program code for persisting the instance in a set of markup formatted descriptors.

16. The computer program product of claim 15, further comprising:

computer usable program code for retrieving the instance of the cross dependency matrix model; and, computer usable program code for administering the operation in performing the tasks for the specific system configuration through processing the instance of the cross dependency matrix model.

17. The computer program product of claim 15, wherein the computer usable program code for defining a selection of tasks for a pattern for a specific system configuration comprises computer usable program code for defining a selection of tasks for one of a system tuning operation, password change operation, and a component name change operation.

* * * * *